United States Patent
Chiu

(10) Patent No.: US 7,986,416 B2
(45) Date of Patent: Jul. 26, 2011

(54) DETECTING SYSTEM AND METHOD FOR CUTTING TOOLS

(75) Inventor: Wen-Chih Chiu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 290 days.

(21) Appl. No.: 12/417,617

(22) Filed: Apr. 2, 2009

(65) Prior Publication Data
US 2010/0183388 A1 Jul. 22, 2010

(30) Foreign Application Priority Data
Jan. 16, 2009 (CN) .......................... 200910300237

(51) Int. Cl.
*G01B 11/14* (2006.01)
*G01N 21/86* (2006.01)
(52) U.S. Cl. ................... 356/614; 356/635; 250/559.4
(58) Field of Classification Search .......... 356/614–625, 356/634–636; 250/559.38, 559.19, 559.4, 250/559.24; 33/636, 628; 219/124.34, 125.1
See application file for complete search history.

(56) References Cited

U.S. PATENT DOCUMENTS

| | | | | |
|---|---|---|---|---|
| 4,505,074 A * | 3/1985 | Kogure | .............................. | 451/5 |
| 4,974,165 A * | 11/1990 | Locke et al. | ................... | 700/193 |
| 5,442,565 A * | 8/1995 | Galel | ............................ | 700/160 |
| 5,568,260 A * | 10/1996 | Schneiter | ....................... | 356/601 |
| 5,948,292 A * | 9/1999 | Tanaka et al. | ............ | 219/121.82 |
| 6,452,134 B2 * | 9/2002 | Hong | ........................ | 219/124.34 |
| 6,724,491 B2 * | 4/2004 | Matsunaga et al. | ........... | 356/623 |
| 6,973,738 B2 * | 12/2005 | Kaneda et al. | .................. | 33/636 |
| 7,140,469 B2 * | 11/2006 | Deplazes et al. | .............. | 187/316 |

* cited by examiner

*Primary Examiner* — Sang Nguyen
(74) *Attorney, Agent, or Firm* — Zhigang Ma

(57) ABSTRACT

A size and position detecting system includes a laser sensor and a controller. The laser sensor includes an emitter emitting a laser beam to a receiver. The controller is configured to compute a first time of how long the emitter emits the laser beam and a second time of how long the receiver receives the laser beam when a cutting tool moves along a first direction perpendicular to and coplanar with a straight line connecting the emitter and the receiver. The controller is configured to record a first position of the cutting tool at a moment when the second time is less than the first time, and a second position of the cutting tool when the second time remains changeless for a predetermined amount of time, to determine whether the cutting tool is off-centered according coordinates difference between the first and second positions along the first direction.

4 Claims, 4 Drawing Sheets

US 7,986,416 B2

DETECTING SYSTEM AND METHOD FOR CUTTING TOOLS

BACKGROUND

1. Technical Field

The present disclosure relates to detecting systems and methods, and particularly, to a size and position detecting system and a size and position detecting method for a cutting tool.

2. Description of Related Art

In a computer numerical control (CNC) system, a cutting tool is a significant component used for machining metal workpieces. During a machining process, when a new cutting tool is chosen, dimensions, such as a diameter of the new cutting tool should be measured to ensure machining precision. In addition, position of the new cutting tool should be checked to determine whether it is off-centered because of vibration during the machining process. If the new cutting tool is off-centered, the CNC system should be adjusted. However, the measuring and checking process is time-consuming.

DETAILED DESCRIPTION

Figure 1:
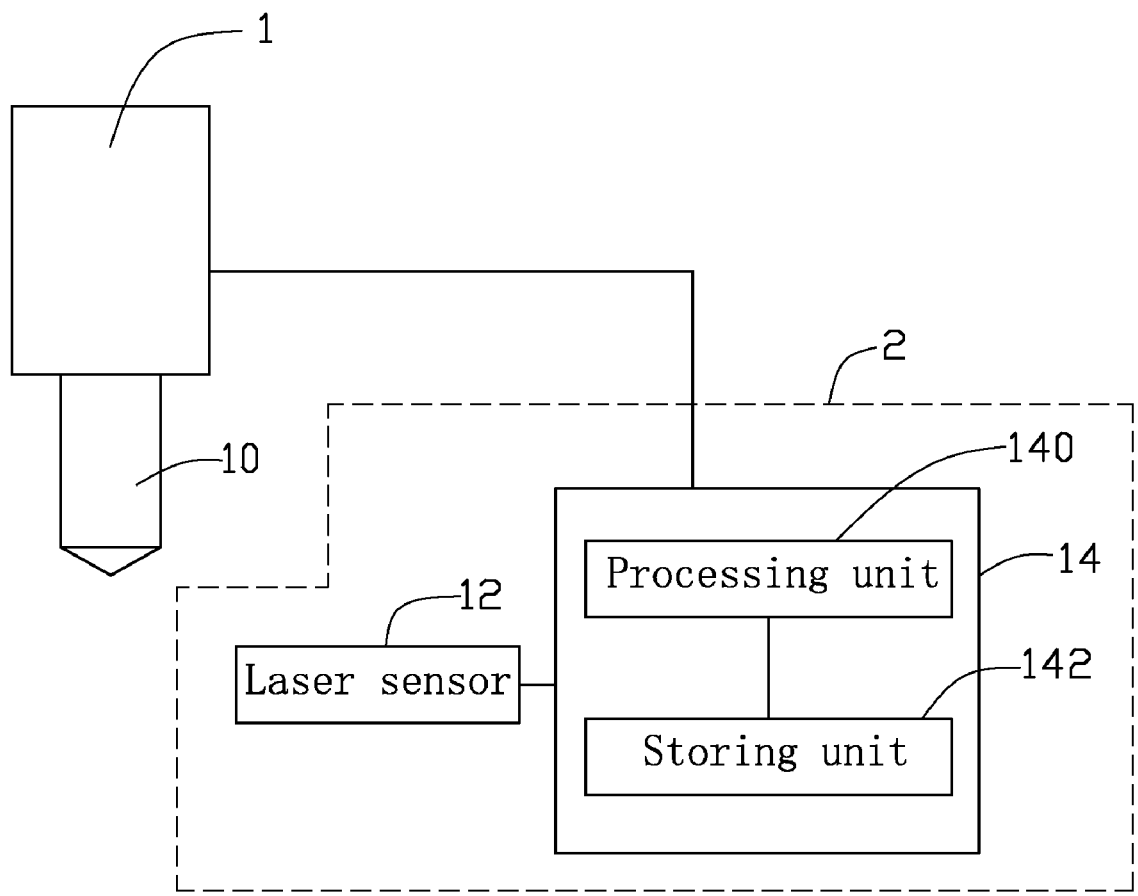
FIG. 1 is a block diagram of an exemplary embodiment of a size and position detecting system for a cutting tool, the size and position detecting system including a carrier, and a laser sensor.
Figure 2:
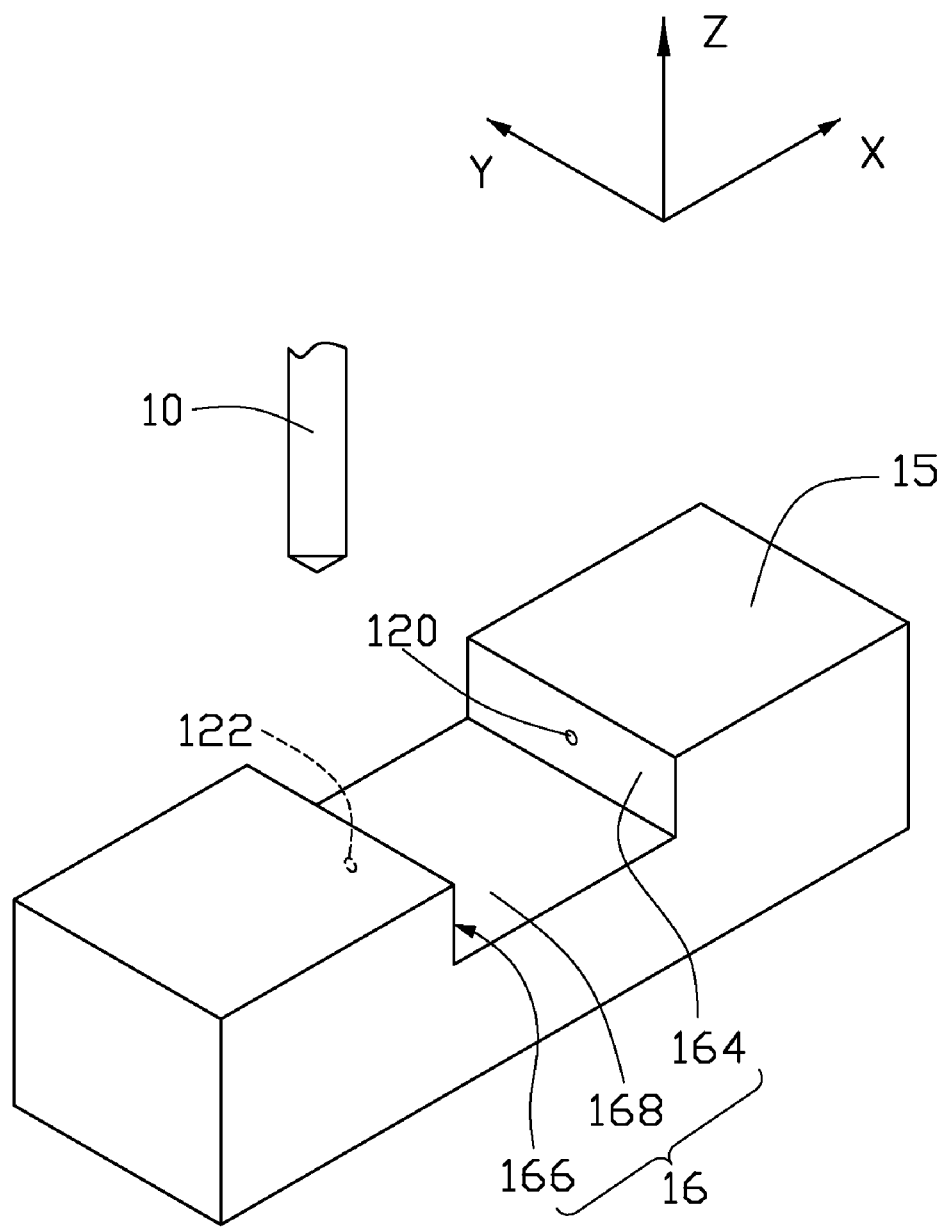
FIG. 2 is an isometric view of the cutting tool, the carrier, and the laser sensor.

Referring to FIGS. 1-2, an exemplary embodiment of a size and position detecting system 2 may be used in conjunction with a cutting tool 10 of a printed circuit board (PCB) drill 1 or a computer numerical control (CNC) system. In one embodiment, the PCB drill 1 includes a substantially U-shaped carrier 15 defining a depressed portion 16. The size and position detecting system 2 includes a laser sensor 12 and a controller 14. The laser sensor 12 includes an emitter 120 and a receiver 122. The controller 14 includes a processing unit 140 and a storing unit 142. The depressed portion 16 is contoured to form a first sidewall 164 and a second sidewall 166 opposite to the first sidewall 164, and a bottom portion 168. The emitter 120 is positioned in a middle of the first sidewall 164 and the receiver 122 is positioned in a middle of the second sidewall 166 so a substantially straight path exists between the first and second sidewalls 164, 166.

The processing unit 140 is configured to control the emitter 120 to emit a signal beam, such as a laser beam, compute a first time t1 of the emitter 120 emitting the laser beam, compute a second time t2 of the receiver 122 receiving the laser beam, and compute positions, such as coordinates, of the cutting tool 10. The storing unit 142 is configured to store the coordinates of the cutting tool 10 computed by the processing unit 140. It may be understood that the first time t1 is a period of time of how long the emitter 120 emits the laser beam, such as 1 minute. The second time t2 is a period of time of how long the receiver 122 receives the laser beam, such as 1 minute or 50 seconds.

Figure 3A:
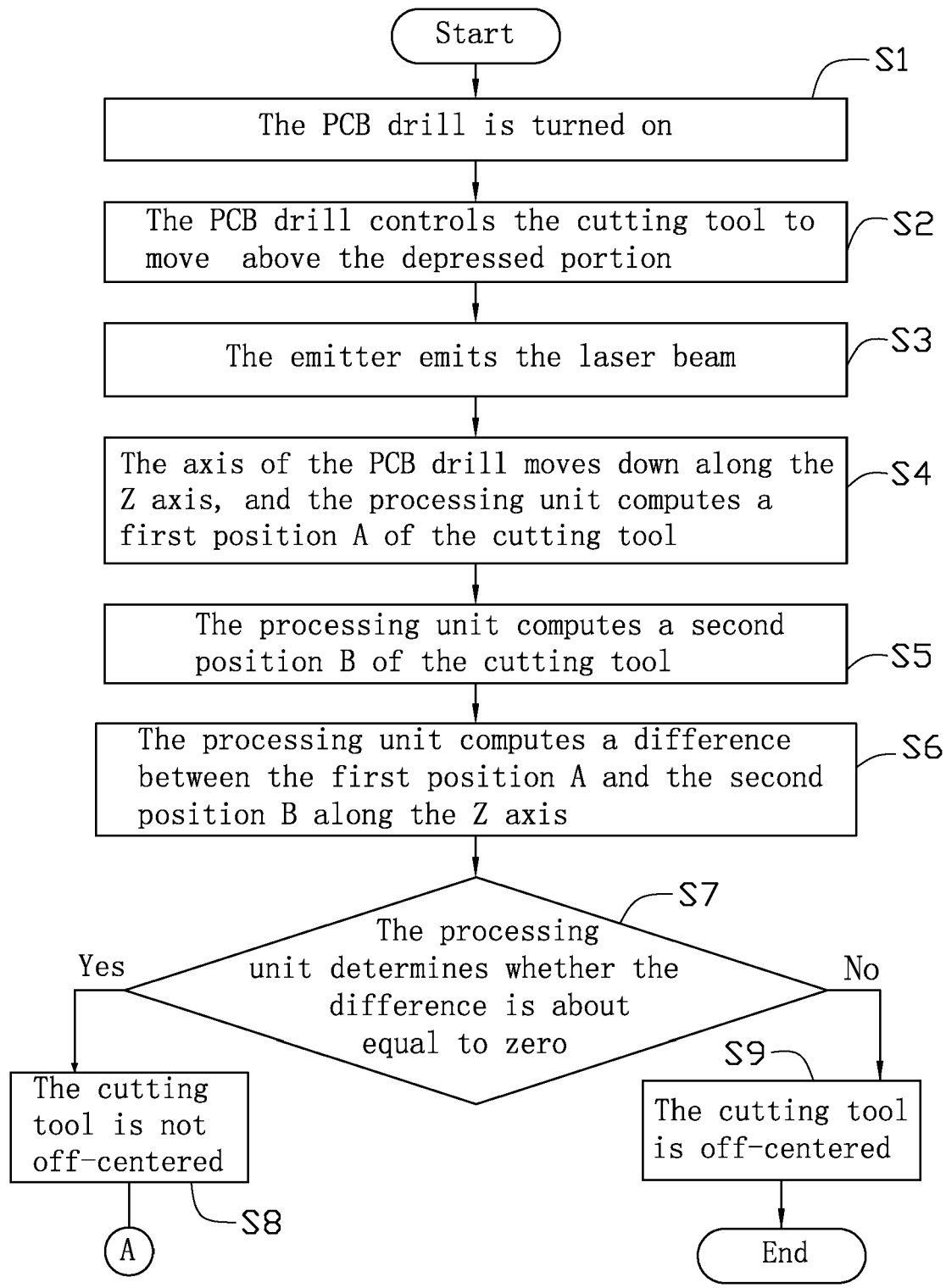
FIGS. 3A and 3B are two parts of a flowchart of an embodiment of a size and position detecting method for a cutting tool.
Figure 3B:
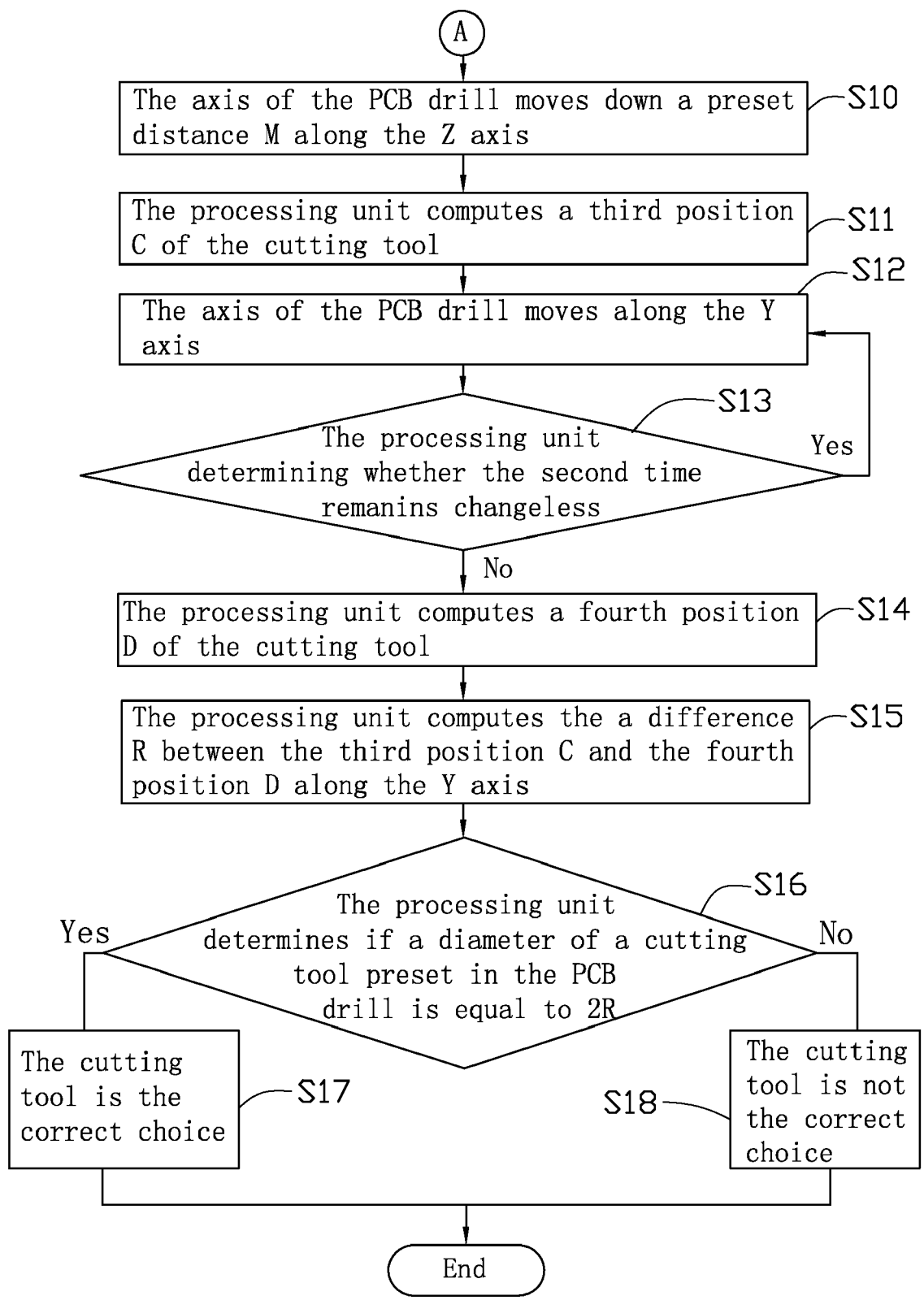

Referring to FIGS. 3A and 3B, an exemplary embodiment of a size and position detecting method for the cutting tool 10 includes the following steps.

In step S1, the PCB drill 1 is turned on.

In step S2, the PCB drill 1 controls the cutting tool 10 to move to a position above the depressed portion 16. In one embodiment, the cutting tool 10 is on a vertical bisector of a line between the emitter 120 and the receiver 122. An axis of the PCB drill 1 starts to rotate to drive the cutting tool 10 to rotate. If a speed of the axis of the PCB drill 1 reaches a preset speed, the flow moves to step S3.

In step S3, the laser sensor 12 is started via the controller 14. The emitter 120 emits the laser beam which travels along the path to be received by the receiver 122. At this moment, the second time t2 of the receiver 122 receiving the laser beam is equal to the first time t1 because the cutting tool 10 is positioned above the emitter 120 and the receiver 122. In other words, the cutting tool 10 is positioned so it is not blocking the path of the laser beam between the receiver 122 and the emitter 120, and the laser beam from the emitter 120 is transmitted to the receiver 122 all the time.

In step S4, an axis of the PCB drill 1 moves down towards the bottom 168 of the depressed portion 16 of the carrier 15 along the Z axis shown in FIG. 2. In other words, the cutting tool 10 moves along a first direction perpendicular to and coplanar with a substantially straight line connecting the emitter 120 and the receiver 122. During a process of moving the axis of the PCB drill 1, the processing unit 140 durative computes the second time t2 of the receiver 122 receiving the laser beam at each moment. At a moment when the second time t2 is less than the first time t1, such as the first time t1 is 1 minute and the second time t2 is 59 seconds, the processing unit 140 computes the present position of the cutting tool 10 as a first position A and stores the first portion A in the storing unit 142. At this moment, the laser beam from the emitter 120 just contacts the cutting tool 10. In other words, the bottom of the cutting tool 10 is just on the edge of the laser beam. As a result, the first time t1 of the emitter 120 emitting the laser beam is greater than the second time t2 of the receiver 122 receives the laser beam.

In step S5, the axis of the PCB drill 1 is moved further down, while the processing unit 140 continues to compute the second time t2. When the second time t2 remains changeless for a predetermined amount of time, such as 10 ms, the processing unit 140 computes the position of the cutting tool 10 when the second time t2 is just changeless as a second position B and stores the second position B in the storing unit 142. The second time t2 is changeless means that the receiver 122 cannot receive the laser beam. As a result, at this moment, the laser beam from the emitter 120 cannot be transmitted to the receiver 122 because of the path between the emitter 120 and the receiver 122 is completely blocked by the cutting tool 10.

In step S6, the processing unit 140 computes a difference $\epsilon_1$ between the first position A and the second position B along the Z axis.

In step S7, the processing unit 140 determines whether $\epsilon_1$ is equal to about zero. If $\epsilon_1$ is about equal to zero, the flow moves to step S8. If $\epsilon_1$ is not equal to about zero, the flow moves to step S9.

In step S8, if $\epsilon_1$ is equal to about zero, the first position A and the second position B are in substantially the same position. In other words, when the cutting tool 10 is positioned for a rotating process, the cutting tool 10 is at the first position A causing the cutting tool 10 to completely block the path of the laser beam. Therefore, the axis of the cutting tool 10 is immovable during the rotating process of the cutting tool 10, which means the cutting tool 10 is not off-centered. The flow moves to step S9.

In step S9, if the difference $\epsilon_1$ is not equal to about zero, the first position A is different from the second position B. In other words, during the rotating process of the cutting tool 10 when the cutting tool 10 is at the first position A, the cutting tool 10 does not completely block the path of the laser beam. Therefore, the axis of the cutting tool 10 is movable during the rotating process of the cutting tool 10, which means the cutting tool 10 is off-centered. As a result, the position detecting method for the cutting tool 10 should be ended. The PCB drill 1 should be stopped to adjust parameters thereof. It may be understood that when the cutting tool 10 is rotating, the cutting tool 10 has an axis at each position. If the axes are different from each other, the axis of the cutting tool 10 is movable.

In step S10, the axis of the PCB drill 1 moves down a preset distance M which is less than a height of the cutting tool 10 along the Z axis.

In step S11, the cutting tool 10 stops moving and the processing unit 140 computes the present position of the cutting tool 10 as a third position C and stores the third position C in the storing unit 142. At this moment, because the cutting tool 10 is not off-centered during the machining process, the laser beam from the emitter 120 is projected on a midpoint of an outer surface of the cutting tool 10. A straight line between the point of the outer surface and the emitter 120 is parallel to the X axis shown in FIG. 2, and coplanar with the axis of the cutting tool 10.

In step S12, the axis of the PCB drill 1 moves along the Y axis shown in FIG. 2.

In step S13, the processing unit 140 computes the second time t2. If the second time t2 remains changeless, namely the receiver 122 cannot receive the laser beam, the axis of the PCB drill 1 continues to move along the Y axis. If the second time t2 has increased, namely the receiver 122 can receive the laser beam, such as at a moment when the second time t2 increases from 50 seconds to 51 seconds, the flow moves to step S14.

In step S14, the processing unit 140 computes the present position of the cutting tool 10 as a fourth position D and stores the fourth position D in the storing unit 142.

In step S15, the processing unit 140 computes a difference R between the third position C and the fourth position D along the Y axis. At this moment, because the cutting tool 10 is not off-centered during the machining process, the difference R is a radius of the cutting tool 10. As a result, a diameter of the cutting tool 10 is about 2 R.

In step S16, the processing unit 140 determines if a diameter of a cutting tool preset in the PCB drill 1 is equal to about 2 R. If the diameter of the cutting tool preset in the PCB drill 1 is equal to about 2 R, the flow moves to step 17. If the diameter of the cutting tool preset in the PCB drill 1 is not equal to 2 R, the flow moves to step 18.

In step S17, the size and position detecting system 2 determines that the diameter of the cutting tool 10 be chosen is right.

In step S18, the size and position detecting system 2 determines that the diameter of the cutting tool 10 is not right, the PCB drill 1 should be stopped, and the cutting tool 10 should be changed. The size and position detecting method ends.

In other embodiments, the axis of the PCB drill 1 can move in an opposite direction along the Y axis of FIG. 2 to replace the step S12. The detecting method can be used for determining whether the cutting tool 10 is off-centered during the machining process and measuring the diameter of the cutting tool 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A size and position detecting system configured for detecting a size and a position of a cutting tool, the size and position detecting system comprising:
    a laser sensor comprising:
        an emitter positioned to emit a laser beam; and
        a receiver positioned opposite to the emitter, the receiver to receive the laser beam from the emitter; and
        a controller to compute a first time of how long the emitter emits the laser beam, and to compute a second time of how long the receiver receives the laser beam when the cutting tool moves along a first direction perpendicular to and coplanar with a substantially straight line connecting the emitter and the receiver, wherein the controller records a first position of the cutting tool at a moment when the second time is less than the first time, and a second position of the cutting tool when the second time remains changeless for a predetermined amount of time, to determine whether the cutting tool is off-centered according a difference between the first and second positions along the first direction.

2. The detecting system of claim 1, wherein the controller is further configured to compute the second time when the cutting tool moves along a second direction perpendicular to the first direction and the straight line connecting the emitter and the receiver, wherein the controller records a third position of the cutting tool when the cutting tool is at a midpoint between the emitter and the receiver, and a fourth position of the cutting tool at a moment when the second time increases, to measure a diameter of the cutting tool according a difference between the third and fourth positions along the second direction.

3. A position detecting method for detecting a position cutting tool, comprising:
    providing a laser sensor comprising an emitter and a receiver;
    moving the cutting tool above the laser sensor, and controlling a rotational speed of the axis of the cutting tool to a preset speed;
    turning on the emitter to emit a laser beam towards the receiver;
    moving the cutting tool towards along a direction perpendicular to and coplanar with a straight line connecting the emitter and the receiver, computing a first time of how long the emitter emits the laser beam and a second time of how long the receiver receives the laser beam, and recording a first position of the cutting tool at a moment when the second time is less than the first time;

keeping on moving the cutting tool along the direction, computing the second time, and recording a second position of the cutting tool when the second time remains changeless for a predetermined amount of time;

computing a difference between the first and second positions along the direction; and determining whether the cutting tool is eligible or off-centered according to the difference, wherein the cutting tool is determined to be eligible if the difference is equal to about zero, and wherein the cutting tool is determined to be off-centered if the difference is not equal to about zero.

4. A size detecting method configured for detecting a size of a cutting tool, comprising:

providing a laser sensor comprising an emitter and a receiver;

moving the cutting tool above the laser sensor, with an axis of the cutting tool perpendicular to and coplanar with a straight line connecting the emitter and the receiver, and controlling a rotational speed of the axis of the cutting tool to a preset speed;

turning on the emitter to send a laser beam towards the receiver, and computing a first time of how long the emitter emits the laser beam;

recording a first position of the cutting tool when the cutting tool is at a midpoint between the emitter and the receiver;

moving the cutting tool along a direction perpendicular to the straight line and the axis of the cutting tool, and determining a second time of how long the receiver receives the laser beam, recording a second position of the cutting tool if the second time is greater than the first time, and keep moving the cutting tool if the second time is not greater than the first time;

computing a difference between the first and second positions along the direction to obtain a radius of the cutting tool.

* * * * *